United States Patent
Park et al.

(10) Patent No.: US 11,061,998 B2
(45) Date of Patent: Jul. 13, 2021

(54) APPARATUS AND METHOD FOR PROVIDING SECURITY AND APPARATUS AND METHOD FOR EXECUTING SECURITY TO PROTECT CODE OF SHARED OBJECT

(71) Applicant: INKA ENTWORKS, INC., Seoul (KR)

(72) Inventors: Jung Geun Park, Seongnam-si (KR); Jin Seon Hong, Seoul (KR); Ju-Han Song, Seoul (KR); Seong Jo Lee, Goyang-si (KR)

(73) Assignee: INKA ENTWORKS, INC., Seoul (KR)

( * ) Notice: Subject to any disclaimer, the term of this patent is extended or adjusted under 35 U.S.C. 154(b) by 368 days.

(21) Appl. No.: 16/130,194

(22) Filed: Sep. 13, 2018

(65) Prior Publication Data

US 2019/0163885 A1    May 30, 2019

(30) Foreign Application Priority Data

Nov. 24, 2017  (KR) .......................... 10-2017-0158133

(51) Int. Cl.
*H04L 29/06*  (2006.01)
*G06F 21/14*  (2013.01)
(Continued)

(52) U.S. Cl.
CPC .............. *G06F 21/14* (2013.01); *G06F 21/57* (2013.01); *G06F 21/602* (2013.01); *G06F 21/78* (2013.01);
(Continued)

(58) Field of Classification Search
CPC .................. G06F 9/44521; G06F 21/54; G06F 2221/2107
See application file for complete search history.

(56) References Cited

U.S. PATENT DOCUMENTS 6,112,025 A * 8/2000 Mulchandani ...... G06F 9/44521
                                                 719/331
7,685,596 B1 * 3/2010 Webb ...................... G06F 16/13
                                                 717/177
(Continued)

FOREIGN PATENT DOCUMENTS

KR      10-1536920      6/2015
KR      10-1671336      9/2015
KR      10-1695639      2/2016

*Primary Examiner* — Jason K Gee
(74) *Attorney, Agent, or Firm* — Nixon & Vanderhye P.C.

(57) ABSTRACT

Disclosed are an apparatus and a method for providing security and an apparatus and a method for executing security to protect a code of a shared object. An apparatus for providing security includes: an object file extraction unit configured to extract a shared object file from an execution package; an object management unit configured to store separately a value of at least one tag of an initialization-function-related section of the shared object file and provide a security shared object file generated by populating with 0 the value of the at least one tag of the shared object file; a security module generation unit configured to generate a security module file including the value of the at least one tag separately stored by the object management unit; and a packet assembly unit configured to generate a security execution package including an execution engine library, a security shared object file provided by the object management unit, and a security module file provided by the security module generation unit, thereby completely protecting the important execution code of the shared object file from a static analysis attack.

18 Claims, 10 Drawing Sheets

(51) Int. Cl.
  *G06F 21/60* (2013.01)
  *H04L 9/06* (2006.01)
  *G06F 21/78* (2013.01)
  *G06F 21/57* (2013.01)
  *H04L 9/08* (2006.01)

(52) U.S. Cl.
  CPC .......... *H04L 9/0631* (2013.01); *H04L 9/0894* (2013.01); *G06F 2221/0724* (2013.01); *H04L 2209/12* (2013.01)

(56) References Cited

U.S. PATENT DOCUMENTS

| | | | | |
|---|---|---|---|---|
| 2002/0087813 | A1* | 7/2002 | Harris | G06F 9/5016 711/148 |
| 2011/0271148 | A1* | 11/2011 | Eigler | H01F 10/32 714/45 |
| 2015/0186681 | A1* | 7/2015 | Lin | G06F 21/6209 713/189 |

* cited by examiner

APPARATUS AND METHOD FOR PROVIDING SECURITY AND APPARATUS AND METHOD FOR EXECUTING SECURITY TO PROTECT CODE OF SHARED OBJECT

This application claims priority to KR Patent Application No. 10-2017-0158133 filed Nov. 24, 2017, the entire contents of which are hereby incorporated by reference.

BACKGROUND OF THE INVENTION

1. Field of the Invention

The present disclosure relates to an apparatus and a method for providing security and an apparatus and a method for executing security to protect a code of a shared object, and more particularly to an apparatus and a method for providing security and an apparatus and a method for executing security to protect an execution code of an initialization function of a shared object from static analysis.

2. Description of the Prior Art

Libraries may be classified as static libraries or shared libraries depending on whether a plurality of applications share and use one library code. The static library (generally a file in the form of *.a) is a library using by incorporation of library code into an application in a linking stage. On the other hand, the shared library (generally a file in the form of "*.so") is a library made to share a library code instance between applications at runtime.

In an application using a shared library, library code is not copied in a linking step. When such a shared library is used, the library code can be shared, so that a memory size can be significantly reduced.

In existing operating systems, for example, Windows or Linux, it is common to use shared libraries. Recently, as the capability of small-sized portable devices including mobile phones increases, various applications can be simultaneously loaded into a memory and executed in such a computing environment. As described above, in a computing environment in which the memory is limited, shared library technology is more strongly required.

A shared object is a shared library (shared object) used in a Linux-based operating system, and the abbreviation "SO" is used as an extension indicating the shared object in practice. An execution file uses a shared object file by loading the shared object file into memory at runtime. The shared object file is not executed by itself, but one shared object file can load and use another shared object file.

Important execution code of shared objects may be leaked by means of inverse analysis through reverse engineering, and additionally, the code may even be modified in a manner desired by a hacker.

SUMMARY OF THE INVENTION

In order to solve the above problems, an aspect of the present disclosure is to provide an apparatus and a method for providing security protecting a shared object file from hacking by providing security to the shared object file.

Another aspect of the present disclosure is to provide an apparatus and a method for executing security protecting a shared object file from hacking by executing the shared object file.

Particularly, an aspect of the present disclosure is to provide an apparatus and a method for providing security protecting a shared object file from hacking by protecting execution code of the shared object from static analysis.

Particularly, another aspect of the present disclosure is to provide an apparatus and a method for executing security protecting a shared object file from hacking via static analysis by executing security to the execution code of the shared object.

In accordance with an aspect of the present disclosure, an apparatus for providing security storing an execution package, generated by assembling a shared object file and an execution engine library, is provided. The apparatus includes: an object file extraction unit, configured to extract the shared object file from the execution package; an object management unit, configured to store separately a value of at least one tag of an initialization-function-related section of the shared object file and provide a security shared object file generated by populating with 0 the value of the at least one tag of the shared object file; a security module generation unit configured to generate a security module file including the value of the at least one tag separately stored by the object management unit; and a packet assembly unit configured to generate a security execution package including the execution engine library, the security shared object file provided by the object management unit, and the security module file provided by the security module generation unit.

The apparatus for providing security further include a code encryption unit configured to generate a security execution code file by encrypting an image of an execution code section of the shared object file through an encryption algorithm, wherein the package assembly unit further includes the security execution code file generated by the code encryption unit to generate the security execution package.

The code encryption unit may compresses an image of the execution code section of the shared object file through a compression program before encrypting the image through the encryption algorithm.

The encryption algorithm may be an Advanced Encryption Standard (AES) algorithm.

The code encryption unit may separate the image of the execution code section of the shared object file as separate file and then encrypt the image through the encryption algorithm.

An initialization-function-related section of the shared object file may be a dynamic section, and the execution code section of the shared object file may be a text section.

In accordance with another aspect of the present disclosure, an apparatus for executing security is provided. The apparatus includes: a dynamic loader unit configured to, when a dynamic loader is called for a shared object file through an operating system, load the shared object file into memory and receive a base address of the loaded shared object file; and an object management unit configured to read a value of at least one tag of the initialization-function-related section of the separately stored shared object file, add the value to the base address, fetch an initialization function address stored in an address generated by adding the value of the tag to the base address, and call a corresponding initialization function.

The object management unit may call each initialization function by sequentially fetching values of an array from the initialization function address stored in the address generated by adding the value of the tag to the base address, by the number of the size of a dynamic table initialization array of the initialization-function-related section of the shared object file.

The apparatus for executing security may further include a code decryption unit configured to decrypt a security execution code file provided after encrypting an image of an execution code section of the shared object file through an encryption algorithm.

The code decryption unit may decrypt the security execution code file stored as separate file and reconstruct the security execution code file at the location of the execution code section of the shared object file loaded into the memory.

In accordance with another aspect of the present disclosure, a method of providing security is provided. The method includes: storing an execution package generated by assembling a shared object file and an execution engine library; extracting the shared object file from the execution package; storing separately a value of at least one tag of an initialization-function-related section of the shared object file, populating with 0 the value of the at least one tag of the shared object file, and providing a security shared object file; generating and providing a security module file including the value of the at least one tag separately stored in the providing of the security shared object file; and generating a security execution package including the execution engine library, the security shared object file provided in the providing of the security shared object file, and the security module file provided in the generating of the security module file.

In accordance with another aspect of the present disclosure, a method of executing security is provided.

The method includes: calling a dynamic loader for a shared object file through an operating system; loading the shared object file into memory by an operation of the dynamic loader and receiving a base address of the loaded shared object file; reading a value of at least one tag in an initialization-function-related section of the separately stored shared object file and adding the value to the base address; and fetching an initialization function address stored in an address generated by adding the value of the tag to the base address and calling a corresponding initialization function.

The method of executing security may further include populating with a meaningless value an initialization function address stored at a location of an object file region indicated by an offset value of at least one tag in the initialization-function-related section of the shared object file.

The method of executing security may further include populating with a meaningless value an ELF header region of the shared object file.

According to the above-described configuration, the present disclosure can more assuredly protect important execution code of a shared object file from a static analysis attack.

Further, the present disclosure can prevent dump and reuse of a shared object by hiding some pieces of information required for normal execution of a shared object file.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, preferable embodiments of an apparatus and a method for providing security and an apparatus and a method for executing security to protect a code of a shared object according to the present disclosure will be described with reference to the accompanying drawings. For reference, in the following description, the terms referring to elements of the present disclosure are set in consideration of the functions of the elements, and thus should not be construed to limit the technical elements of the present disclosure.

Figure 1:
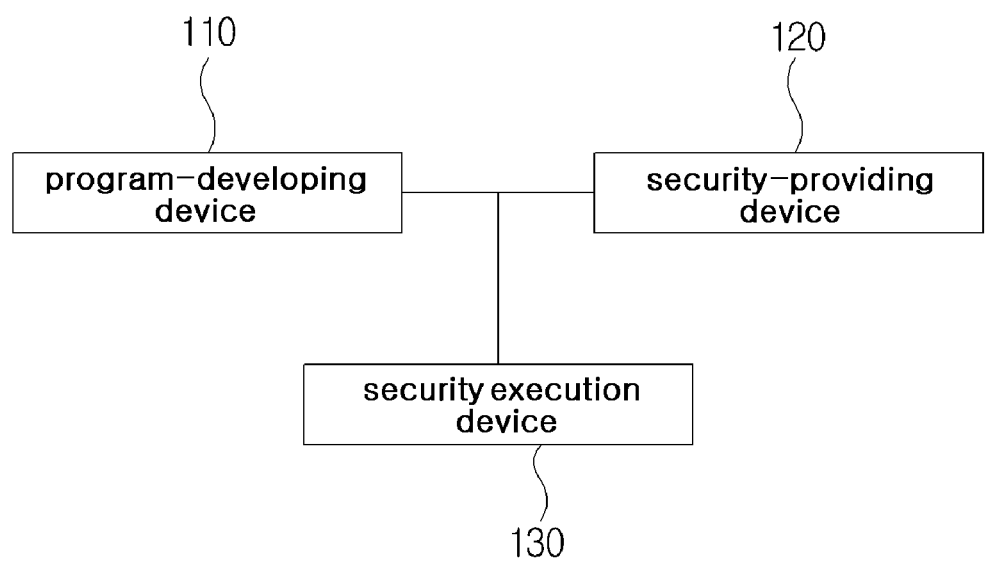
FIG. 1 is a block diagram illustrating a security-providing system for protecting a code of a shared object according to an embodiment of the present disclosure.

FIG. 1 is a block diagram illustrating a security-providing system for protecting a code of a shared object according to an embodiment of the present disclosure.

As illustrated in FIG. 1, the security-providing system for protecting the code of the shared object according to the present disclosure includes a program-developing device 110, a security-providing device 120, and a security execution device 130. The program-developing device 110, the security-providing device 120, and the security execution device 130 may be connected through a wired/wireless communication network.

The program-developing device 110 is a device through which a developer develops an application program. When an application is developed, an execution engine, for example, a unity engine, creates binary code by compiling application source codes and creates an execution package, for example, a unity package including the created binary code and a necessary resource library.

The security-providing device 120 is a device for providing security for the unity package created by the program-developing device 110. When the unity package created by the program-developing device 110 is uploaded, the security-providing device 120 extracts a shared object file, encrypts an execution code of the extracted object, stores in a separate region a value of at least one tag value related to an initialization function of the shared object, adds a security module file, and then creates a security unity package again.

The security execution device 130 is a user terminal device for executing an executable program, for example, a game program. The security execution device 130 may download a security unity package from the program-developing device 110 or the security-providing device 120 and execute the execution program.

Although FIG. 1 illustrates the program-developing device 110 and the security-providing device 120 as separate device, this is only an example, and the present disclosure is not limited thereto.

Figure 2:
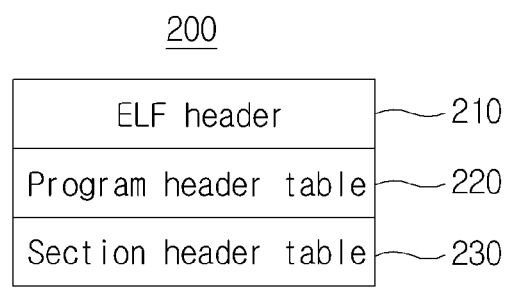
FIG. 2 schematically illustrates a structure of a general shared object file.
Figure 3:
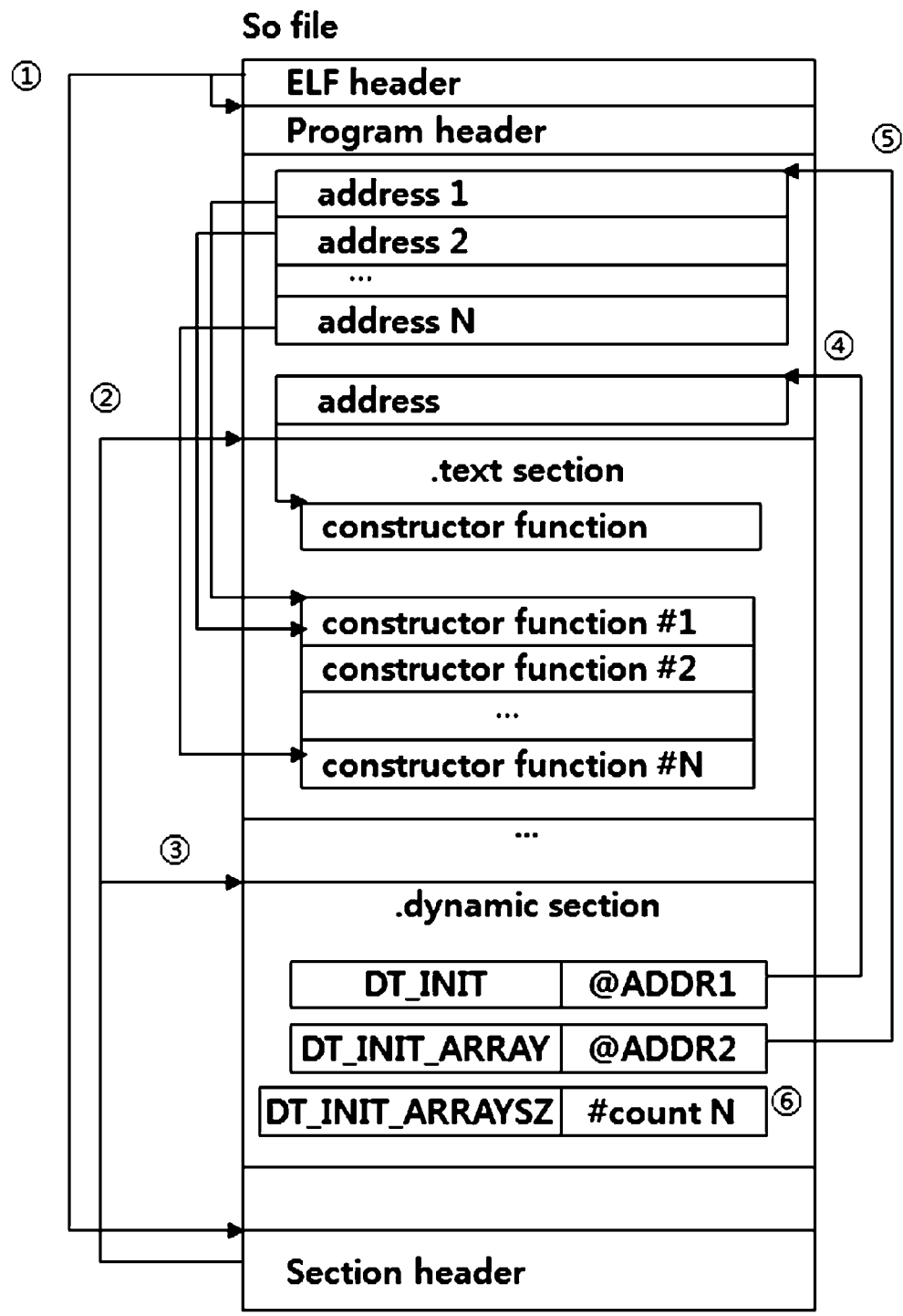
FIG. 3 illustrates a structure of a shared object file in detail to describe the present disclosure.

FIG. 2 schematically illustrates a structure of a general shared object file, and FIG. 3 illustrates a structure of the shared object file in detail to describe the present disclosure.

As illustrated in FIG. 2, the shared object (SO) file has an Executable and Linkable Format (ELF) form. The ELF is a standard file form for an execution file, an object file, a shared library, and a core dump. The ELF was selected as the standard file format of X86-based Unix and a Unix-like system by the 86open project in 1999.

Referring to FIG. 2, a SO file 200 according to an embodiment of the present disclosure includes one ELF header 210 at the very front of the SO file, a program header table 220 that defines segments including information required for runtime execution of the SO file, and a section header table that defines sections including important information required for linking and rearrangement.

Meanwhile, a dynamic loader (dlopen) performs a task of accessing the SO file through a system function provided by a Unix-like operating system, loading the SO file into the memory, and preparing the SO file for actual use thereof. In order to use the SO file in an application file or an execution file, the function dlopen must necessarily be called. Thereafter, when a request for dlopen is made again in another execution file or the SO file, the SO file loaded into the memory by the call of the function dlopen provides a link through which information already loaded into the memory can be reused without repeating a memory loading process. Technology for protecting a code region of the SO file according to the present disclosure is implemented using the characteristics of the function dlopen.

As illustrated in FIG. 3, the program header table 220 illustrated in FIG. 2 includes a program header and a program table region having at least one address required for runtime execution of the SO file. Further, the section header table 230 includes a section header, a text section (.text section), and a dynamic section (.dynamic section).

The section header may store information on locations and sizes of various sections (a bundle of data) in the SO file, and a section is a valid concept when the ELF is used for a shared library and may be a unit of a bundle of binary data. Among various sections, the text section may include all program codes and the dynamic section may include tags and the value of the tags, and thus the sections are the most important sections to be protected in the present disclosure.

A constructor within the text section is an initialization function or a set of initialization functions that should be executed only once unconditionally when the shared library is first loaded into a memory. When the request for dlopen is made in a system, the system executes constructor functions therein. When the initialization function is not executed, a program cannot be normally executed. Although dlopen is called several times for the same SO file, all initialization functions are called only once.

Hereinafter, the operation of a shared object file will be described in detail by using on the structure of the shared object file illustrated in FIG. 3.

The ELF header included in the first part of the SO file stores information on locations and the number of program headers and section headers containing additional information. When an execution file loads the SO file, the execution file finds locations of the program headers and the section headers by using the information on the locations and the number of program headers and section headers stored in the ELF header (see ①).

The section header stores information on locations and sizes of various sections in the SO file. The execution file finds the location of a text section by using location information of the text section stored in the section header (see ②). The text section is the most important section related to the present disclosure and corresponds to a region that stores all execution code in the form of binary data and is to be protected through encryption.

The execution file finds the location of a dynamic section by using location information of the dynamic section stored in the section header (see ③). The dynamic section includes a plurality of information in the form of <tag:value>. Among the tags, the dynamic table initialization (DT_INIT) tag, a dynamic table initialization array (DT_INIT_ARRAY) tag, and a dynamic table initialization array size (DT_INIT_ARRAYSZ) tag are used in the present disclosure. The dynamic table initialization (DT_INIT) tag and the dynamic table initialization array (DT_INIT_ARRAY) tag may store a location value (offset) of memory which stores an address of an initialization function called only once by the system at the time point at which an address pointer, that is, the SO file, is first loaded into the memory by dlopen as the value of the tag, and the dynamic table initialization array size (DT_INIT_ARRAYSZ) tag may store the number of initialization functions as the value of the tag.

When the number of initialization functions is one, the value of the dynamic table initialization (DT_INIT) tag is used to indicate one address of a program table region (see ④). However, when the number of initialization functions is plural, the value of the dynamic table initialization array (DT_INIT_ARRAY) tag is used, and all of the N respective initialization functions are sequentially called only once according to N, which is the number of the dynamic table initialization array size (DT_INIT_ARRAYSZ) tag (see ⑤). The number of initialization functions is stored in the value of the dynamic table initialization array size (DT_INIT_ARRAYSZ) tag (see ⑥).

Figure 4:
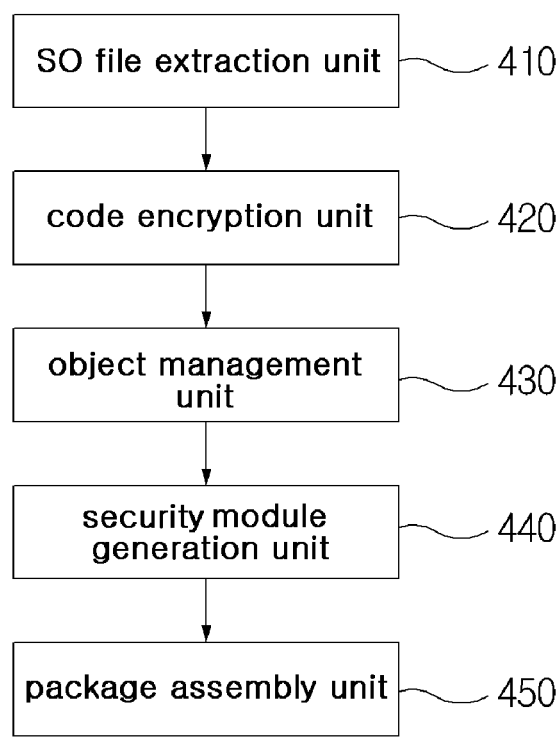
FIG. 4 is a block diagram illustrating a security-providing device of FIG. 1.
Figure 5:
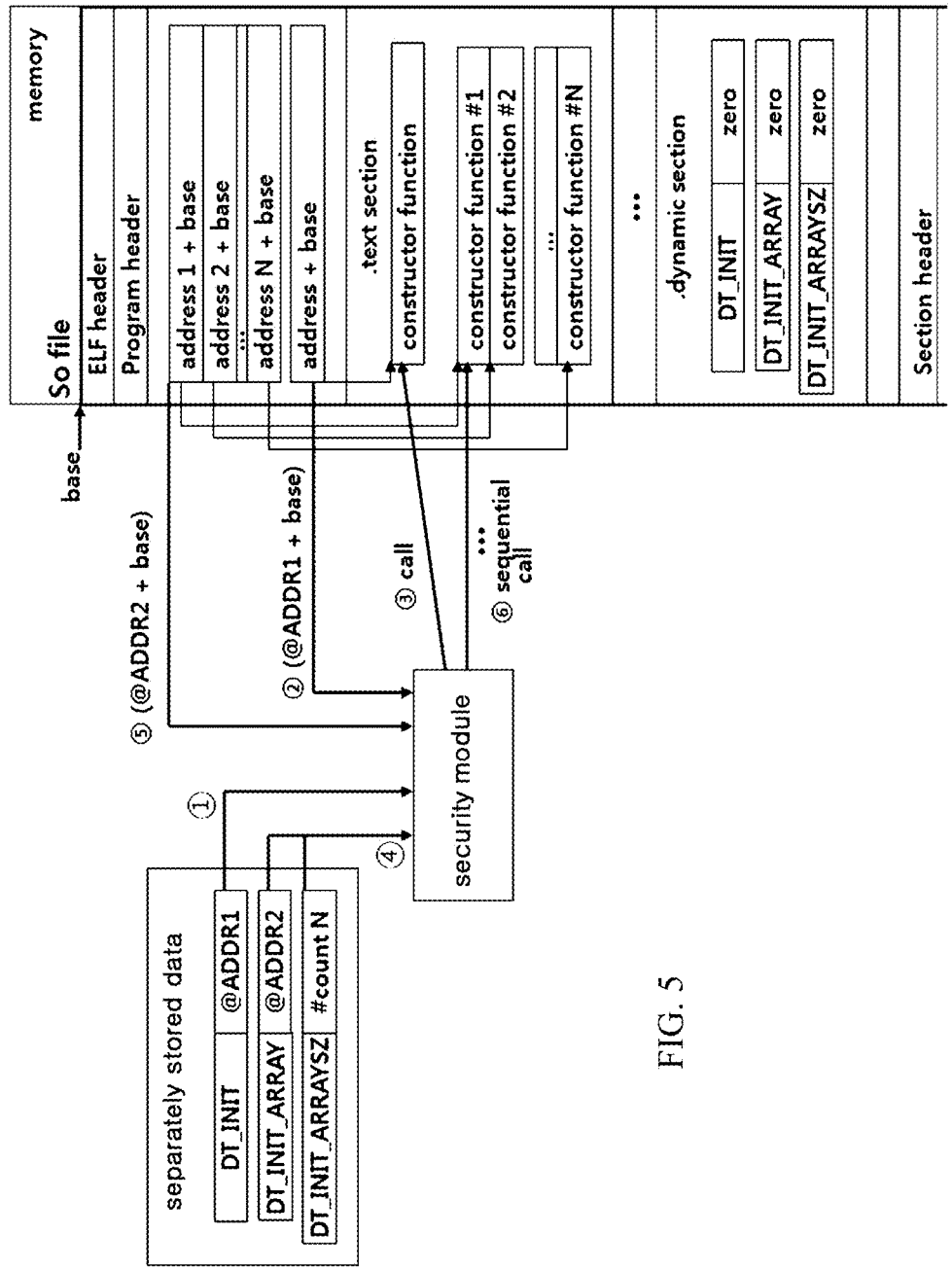
FIG. 5 illustrates an operation of providing security to a shared object file according to an embodiment of the present disclosure.

FIG. 4 is a block diagram illustrating a security-providing device of FIG. 1, and FIG. 5 illustrates an operation of providing security to a shared object file according to an embodiment of the present disclosure.

As illustrated in FIG. 4, the security-providing device 120 includes a SO file extraction unit 410, a code encryption unit 420, an object management unit 430, a security module generation unit 440, and a package assembly unit 450.

The SO file extraction unit 410 extracts an SO file by parsing a plurality of libraries and files of a unity package uploaded from the program-developing device 110. That is, the SO file extraction unit 410 extracts the SO file from the execution package generated by assembling the SO file and an execution engine library.

The code encryption unit 420 separates the entire regions of an execution code section of the SO file, that is, a text section to be protected as separate file, and compresses the separated text section file through a compression program, for example, ZIP. The code encryption unit 420 generates a security text section file by encrypting the text section file compressed by ZIP through an encryption algorithm (see ①). The encryption algorithm may include at least one of the encryption algorithms DES, AES, and RSA. Here, as the second encryption algorithm, it is preferable to use an Advanced Encryption Standard (AES) algorithm through which the entire encrypted DLL is encrypted again.

Since the execution code section, that is, the text section to be protected, is generated as separate file, the object management unit 430 first populates all SO file regions in which there is the text section with 0 (see ②).

The object management unit 430 stores in a separate region values of three tags of a dynamic section and populates all original values within the SO file with 0 (see ③). In this case, if a value of the tag DT_INIT_ARRAYSZ is not changed to 0, then an abnormal code, that is, initialization functions changed to 0, are called, and thus errors occur and the program stops, so that a process of changing the tag value to 0 is necessary to prevent the initialization function from being called.

The security module generation unit 440 is an element for applying security to the SO file and generates a security module file including a value of at least one tag separately stored by the object management unit 430. The security module file generated by the security module generation unit 440 may be a security library file.

The security module generation unit 440 may include a decryption algorithm for decrypting the security SO file encrypted by the code encryption unit 420, and when the code encryption unit 420 stores the security text section file as separate file, may further include an offset value of the original text section.

The security module generation unit 440 may include a hash registry function for verifying the integrity of a library, an anti-debugging function for preventing the analysis of a game program using debugger, and an anti-dump function for preventing the memory state of a game program from being dumped.

The package assembly unit 450 generates a security execution package including an execution engine library, a security execution code file generated by the code encryption unit 420, a security shared object file provided by the object management unit 430, and a security module file provided by the security module generation unit 440.

Figure 6:
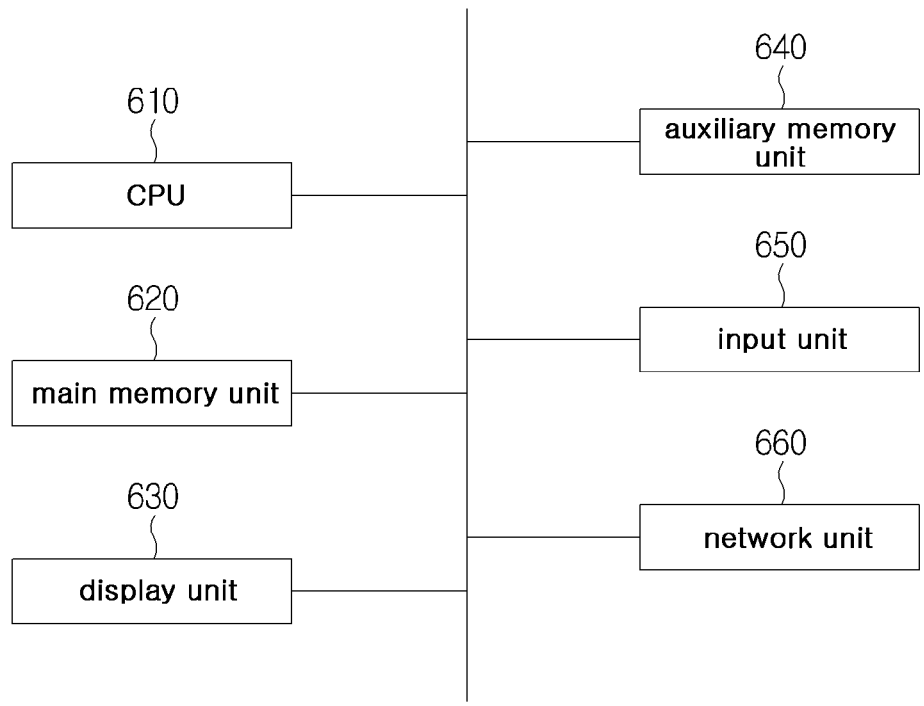
FIG. 6 is a block diagram illustrating a security execution device of FIG. 1.

FIG. 6 is a block diagram illustrating a security execution device of FIG. 1.

As illustrated in FIG. 6, the security execution device 130 may include a CPU 610, a main memory unit 620, a display unit 630, an auxiliary memory unit 640, an input unit 650, and a network unit 660.

The auxiliary memory unit 640 stores a security execution package downloaded from the security-providing device 120 through the network unit 660. When a security execution package, for example, a security unity package of a game program, is requested, the CPU 610 loads the security unity package stored in the auxiliary memory unit 640 into the main memory unit 620. Meanwhile, the game program may receive a new value through the input unit 650 or the network unit 660.

The security execution device 130 according to an embodiment of the present disclosure may be a user terminal such as a Personal Computer (PC), a notebook computer, a tablet, a Personal Digital Assistant (PDA), a game console, a Portable Multimedia Player (PDA), a PlayStation Portable (PSP), a wireless communication terminal, a smart phone, a TV, or a media player.

Figure 7:
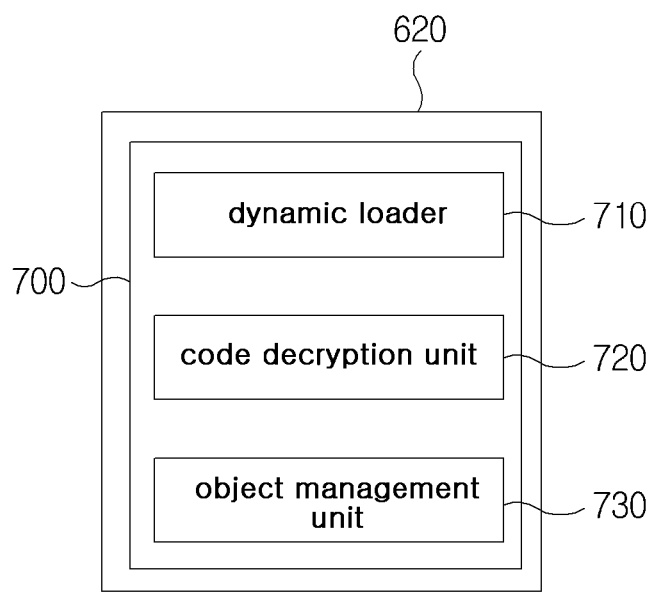
FIG. 7 illustrates a state in which a security module file is loaded into a main memory unit according to an embodiment of the present disclosure.
Figure 8A:
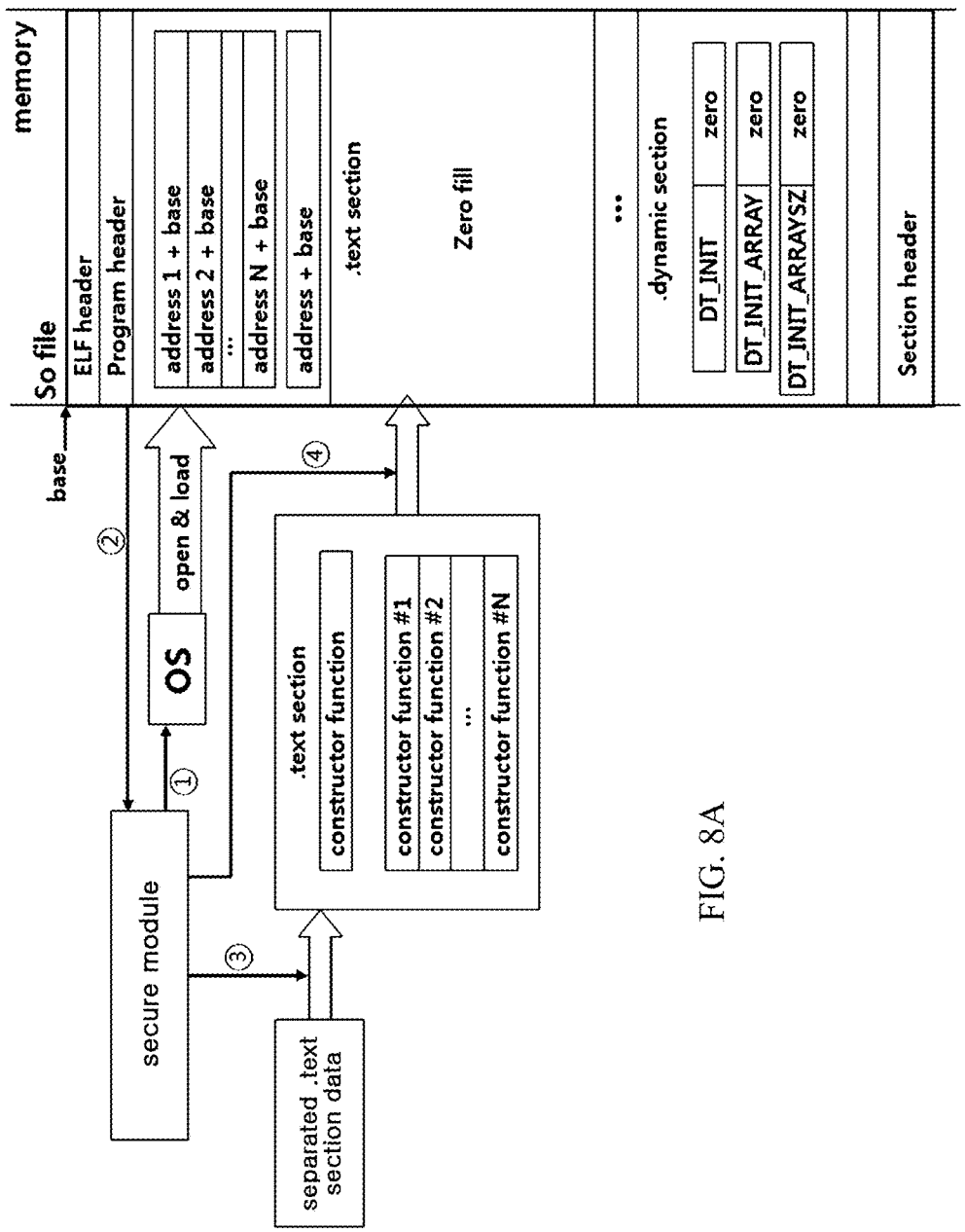
FIGS. 8A to 8C illustrate the operation of a security module file of FIG. 7.
Figure 8B:
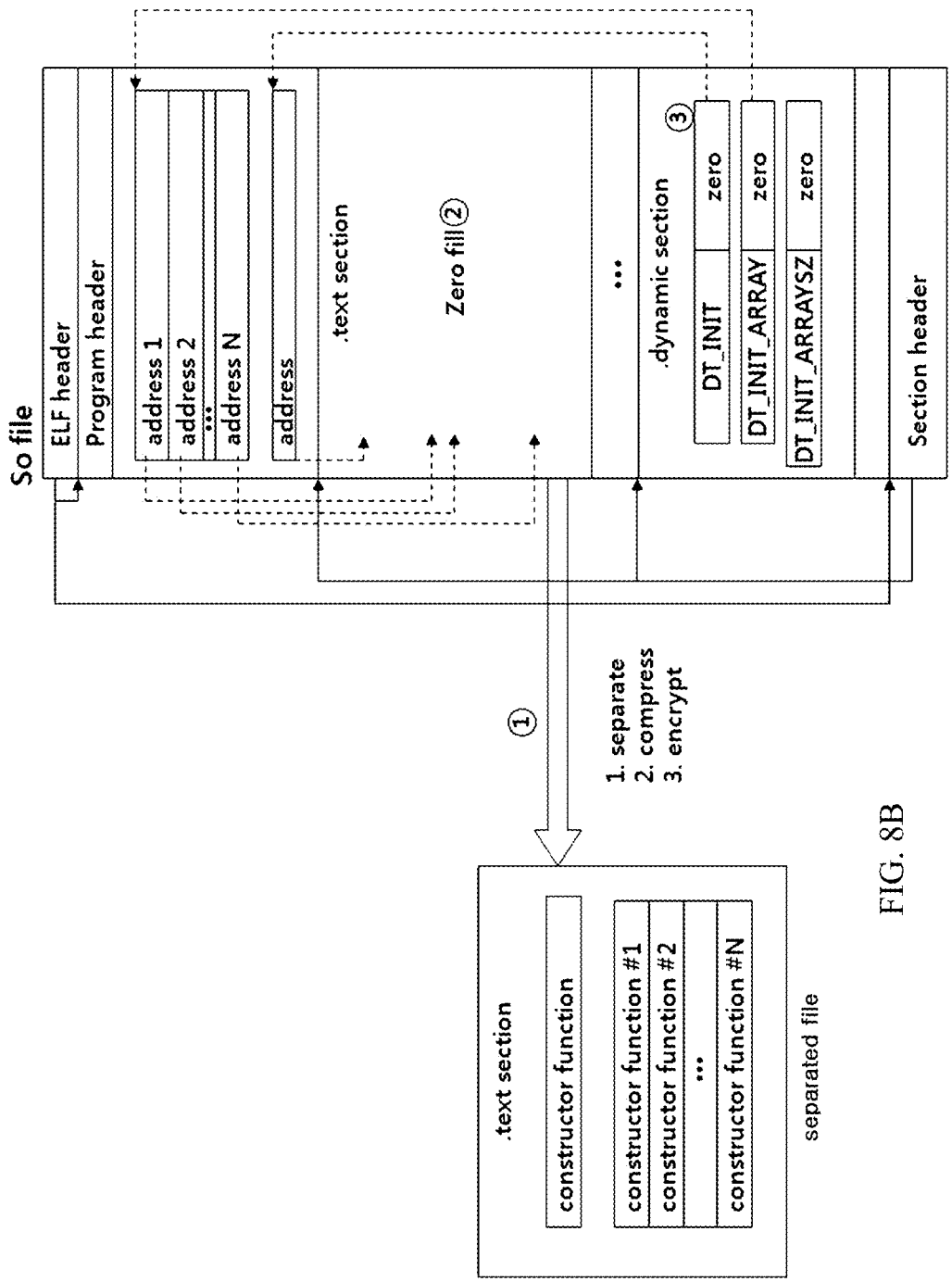
Figure 8C:
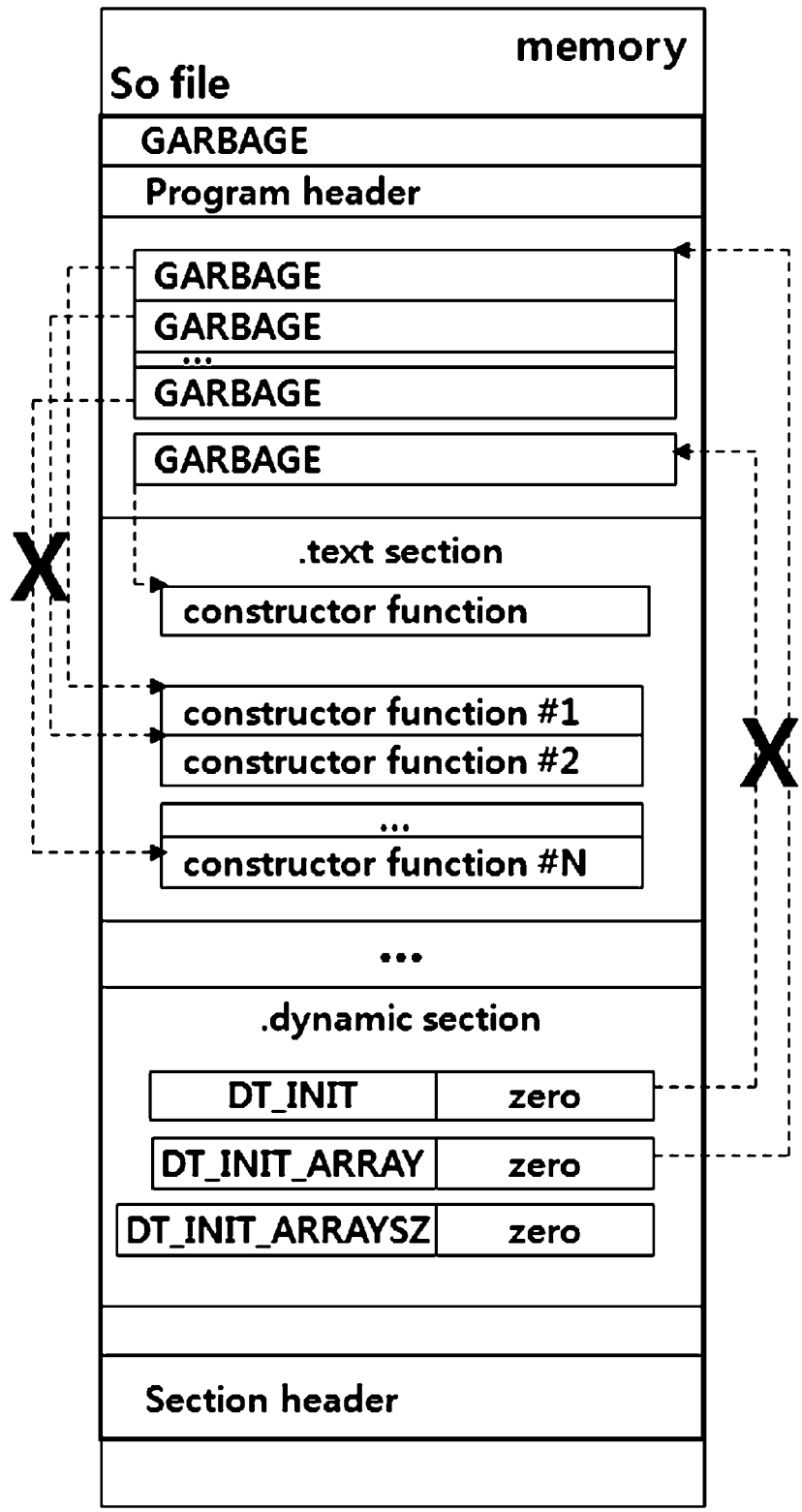

FIG. 7 illustrates a state in which a security module file is loaded into a main memory unit according to an embodiment of the present disclosure. FIGS. 8A to 8C illustrate the operation of the security module file of FIG. 7.

As illustrated in FIG. 7, the security module file 700 includes a dynamic loader unit 710, a code decryption unit 720, and an object management unit 730.

When a dynamic loader is called for the SO file through an operating system, the dynamic loader unit 710 loads the SO file into the main memory unit 620 and receives a base address of the loaded SO file.

The code decryption unit 720 decrypts a security execution code file provided after encrypting an execution code section of an object file through an encryption algorithm. The code decryption unit 720 decrypts the security execution code file stored as separate file and reconstructs the security execution code file at the location of the execution code section of the SO file loaded into the main memory unit 620.

The object management unit 630 reads a value of at least one tag of an initialization-function-related section of the separately stored SO file, adds the value to a base address, fetches an initialization function address stored in the corresponding address of the main memory unit 620, and calls the initialization function. Also the object management unit 630 may respectively call the initialization function by sequentially fetching the values of an initialization function address array stored in the corresponding address of the main memory unit 620, by the number of the size of a dynamic table initialization array of the initialization-function-related section of the SO file.

Hereinafter, the operation of the security module file will be described in more detail with reference to FIGS. 8A to 8C.

An execution file calls the security module file 700 before using a target SO file. When the security module file 700 is called, the dynamic loader (dlopen) is called for the corresponding SO file through an operating system (see ① in FIG. 8A).

The corresponding SO file is loaded into the main memory unit 620 in response to a login within the dynamic loader. When the loading of the SO file is completed, the security module file 700 receives a base address of the loaded SO file (see ② in FIG. 8A).

The security module file 700 decrypts data of a text section stored as separate file and releases data of the text section compressed by a compression algorithm so as to obtain the original data (see ③ in FIG. 8A). The security module file 700 reconstructs the obtained original image to a location in the text section of the SO file region of the main memory unit by using the stored offset value of the text section (see ④ in FIG. 8A).

When the reconstruction of the text section is completed, the security module file 700 first reads a separately stored value of a tag DT_INIT and adds the value of the tag to the base address of the SO file (see ① in FIG. 8B). The security module file 700 fetches an initialization function address stored in an address generated by adding the value of the tag to the base address (see ② in FIG. 8B). The security module file 700 calls the corresponding constructor function by using the initialization function address (see ③ in FIG. 8B). Meanwhile, when the read value of the tag DT_INIT is 0, the security module file 700 proceeds to the next step.

The security module file 700 reads a separately stored value of the tag DT_INIT and adds the value of the tag to the base address of the SO file (see ④ in FIG. 8B). The security module file 700 fetches the initialization function address stored in an address generated by adding the value of the tag to the base address (see ⑤ in FIG. 8B). The security module file 700 calls each initialization function by sequentially fetching values of an initialization function address array by using the initialization function address and the value of the tag DT_INIT_ARRAY (see ⑥ in FIG. 8B).

Since each of all initialization functions has been executed once according to the above-described operation, when the dynamic loader (dlopen) is executed for the corresponding SO file in the executable program, a pointer of data which has already been loaded into the main memory unit 620 and completely decrypted is returned and an application program is executed normally.

Meanwhile, the security module file 700 populates with a meaningless value the initialization function address stored at the location indicated by the tag DT_INIT and also populates with meaningless values all initialization function addresses stored in the array at the location indicated by the tag DT_INIT_ARRAY (see FIG. 8C).

The security module file 700 basically includes an attachment defense function in order to prevent memory dump and dynamic analysis, but a hacker may dump the SO file loaded into the memory by avoiding the attachment defense. However, since information on the initialization functions is populated with the meaningless values, it is impossible to execute normally the initialization functions and modulate the dumped SO file.

Further, the security module file 700 further populates an ELF header region with meaningless values, which makes finding a location for memory dump more difficult (see FIG. 8C). Since the ELF header includes information on a program header and a section header, if a shared object having no information thereon is dumped and reused, an application program may be abnormally executed or may not be executed.

Figure 9:
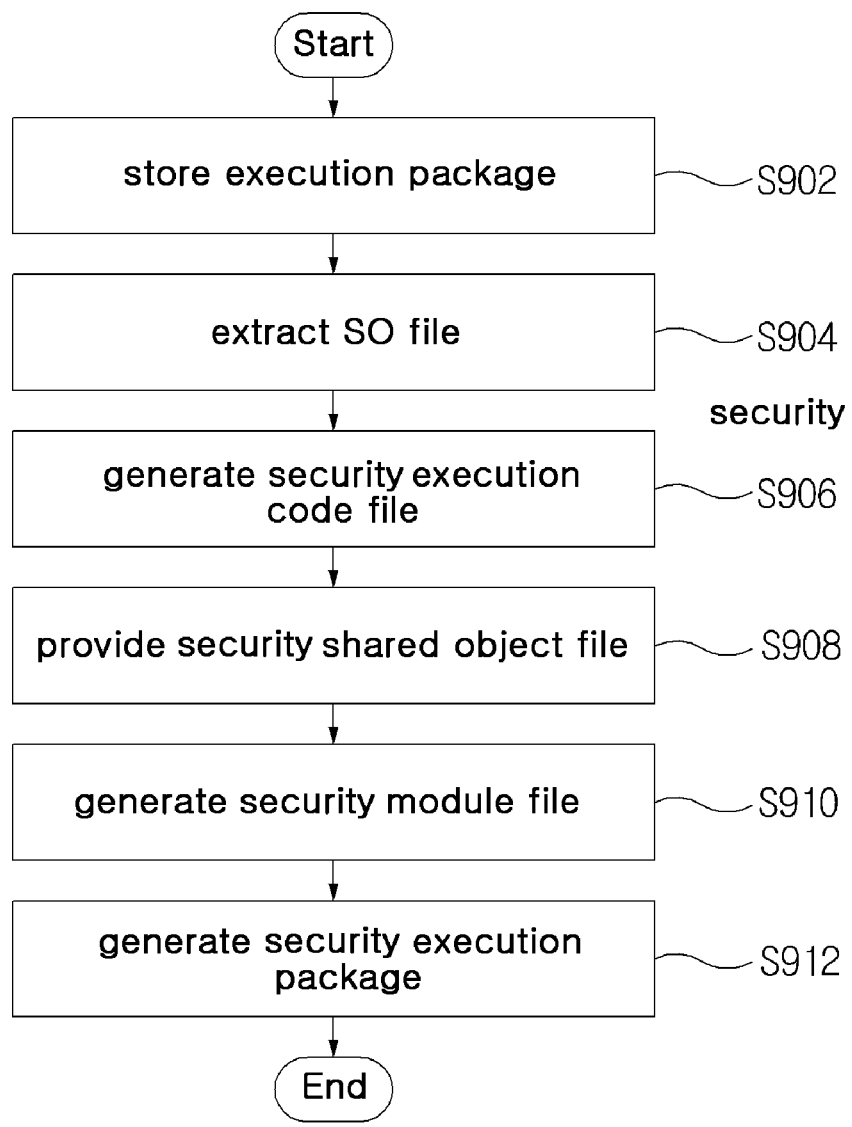
FIG. 9 is a flowchart illustrating a security-providing method to protect a code of a shared object file according to an embodiment of the present disclosure.

FIG. 9 is a flowchart illustrating a security-providing method to protect a code of a shared object file according to an embodiment of the present disclosure.

The security-providing device 120 stores an execution package generated by assembling a shared object file and an execution engine library in S902. The shared object file extraction unit 410 extracts the shared object file from the execution package in S904.

The code encryption unit 420 generates a security execution code file by encrypting an image of an execution code section of the shared object file through an encryption algorithm in S906. In this case, the code encryption unit 420 may perform the encryption through the encryption algorithm after separating the image of the execution code section of the shared object file as separate file.

The object management unit 430 separately stores a value of at least one tag in an initialization-function-related section of the shared object file, populates the value of at least one tag of the shared object file with 0, and provides a security shared object file in S908.

The security module generation unit 440 generates a security module file including a value of at least one tag separately stored by the object management unit 430 in S910. The package assembly unit 450 generates a security execution package including the execution engine library, the security execution code file generated by the code encryption unit 420, the security shared object file provided by the object management unit 430, and the security module file provided by the security module generation unit 440 in S912.

Figure 10:
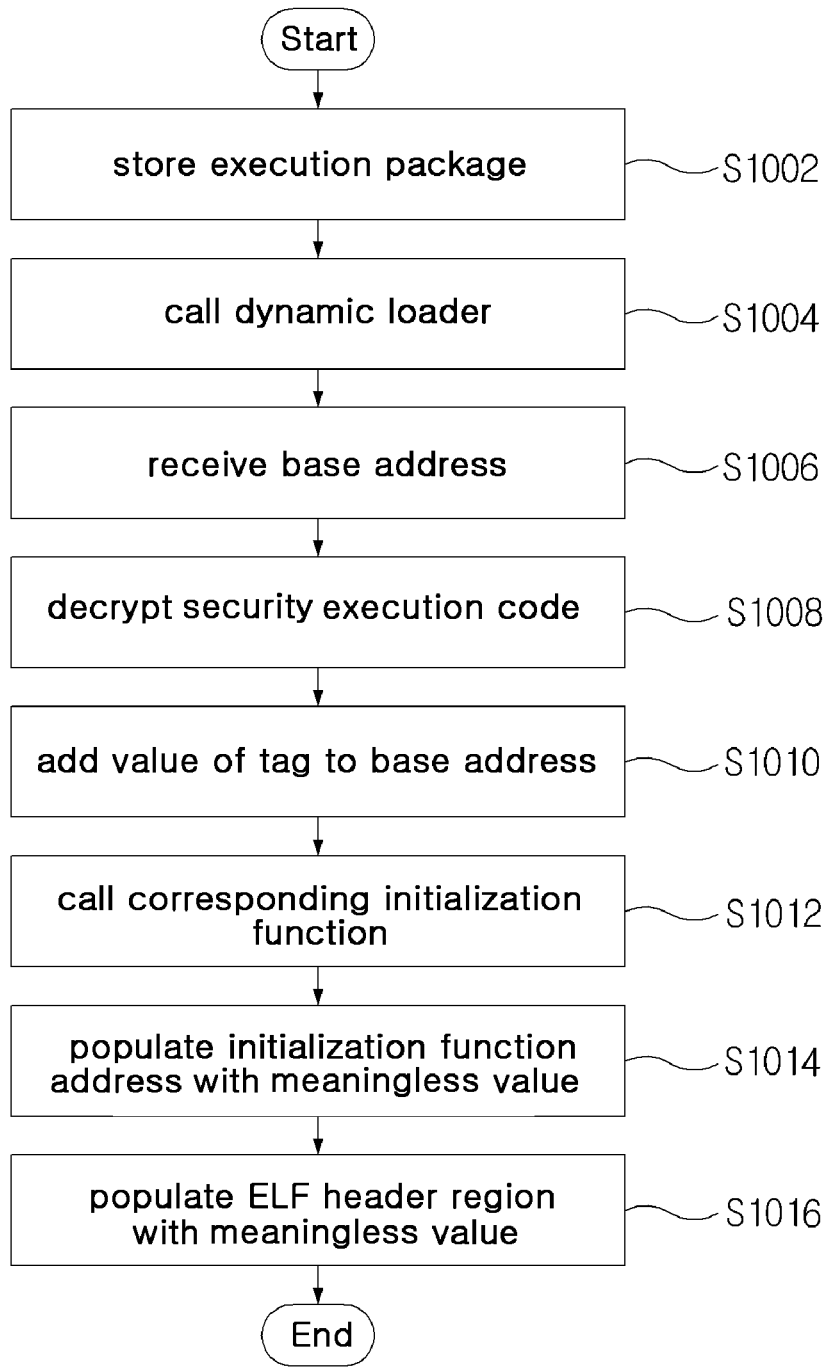
FIG. 10 is a flowchart illustrating a security execution method to protect a code of a shared object file according to another embodiment of the present disclosure.

FIG. 10 is a flowchart illustrating a security execution method to protect a code of a shared object file according to another embodiment of the present disclosure.

An execution file calls the security module file 700 before using a target SO file in S1002. The security module file 700 calls a dynamic loader for the shared object file through an operating system in S1004. The dynamic loader loads the SO file into the main memory unit 620 and returns a base address of the loaded SO file to the security module file 700 so that the security module file 700 receives the base address in S1006.

The security module file 700 decrypts a security execution code file provided after encrypting an execution code section of the object file through the encryption algorithm in S1008. When the security execution code file is stored as separate file, the security module file 700 decrypts the security execution code file stored as separate file and reconstructs the security execution code file at a location in an execution code section of the SO file loaded into the main memory unit 620.

The security module file 700 reads a value of at least one tag in an initialization-function-related section of the separately stored shared object file and adds the value to the base address in S1010.

The security module file 700 fetches an initialization function address stored in a address generated by adding the value of the tag to the base address and calls an initialization function corresponding to the initialization function address in S1012. The security module file 700 may call each initialization function by sequentially fetching values of an initialization function address array stored in the corresponding address of the main memory unit 620, by the number of the size of a dynamic table initialization array of the initialization-function-related section of the SO file.

The security module file 700 populates with a meaningless value an initialization function address stored at the location of an object file region indicated by an offset value of at least one tag in the initialization-function-related section of the shared object file in S1014. The security module file 700 also populates with a meaningless value an ELF header region of the shared object file in S1016.

The embodiments of the present disclosure are merely examples of the technical idea of the present disclosure, and the scope of the present disclosure should be interpreted based on the claims. Further, it can be understood by those skilled in the art that various modifications and changes can be made without departing from the essential features of the present disclosure and that all technical ideas within the equivalent range to the present disclosure should be construed as being included in the scope of the present disclosure.

What is claimed is:

1. An apparatus for providing security for protecting an execution package generated by assembling a shared object file and an execution engine library, wherein the shared object file comprises an initialization-function-related section and an execution code section, the apparatus comprising a first processor configured to control the apparatus for providing security to:
    extract the shared object file from the execution package;
    store a value of at least one tag of the initialization-function-related section of the extracted shared object file in a separate position and generate a security shared object file, wherein the security shared object file is generated by populating with 0 the value of the at least one tag of the initialization-function-related section of the extracted shared object file;
    generate a security module file including the value of the at least one tag stored in the separate position and un-populated with 0; and
    generate a security execution package by combining the execution engine library of the execution package, the generated security shared object file in which the security shared object file includes the tag of the initialization-function-related section populated with 0, and the generated security module file in which the security module file includes the value of the at least one tag of the initialization-function-related section of the extracted shared object file stored in the separate position, wherein at least some part of the execution package can be protected by populating with 0.

2. The apparatus of claim 1, wherein the first processor is further configured to control the apparatus to generate a security execution code file by encrypting an image of an execution code section of the shared object file through an encryption algorithm, wherein the security execution code file is used to generate the security execution package.

3. The apparatus of claim 2, wherein generating the security execution code file includes compressing an image of the execution code section of the shared object file through a compression program before encrypting the image through the encryption algorithm.

4. The apparatus of claim 3, wherein the encryption algorithm is an Advanced Encryption Standard (AES) algorithm.

5. The apparatus of claim 2, wherein generating the security execution code file includes separating the image of the execution code section of the shared object file as separate file and then encrypting the image through the encryption algorithm.

6. A system comprising:
the apparatus for providing security according to claim 1; and
an apparatus for executing security which interacts with the apparatus for providing security, the apparatus for executing security comprising a second processor configured to control the apparatus for executing security to:
when a dynamic loader is called for the shared object file through an operating system, load the shared object file into a memory and receive a base address of the loaded shared object file; and
read a value of at least one tag of the initialization-function-related section of the stored shared object file in the separate position, add the value of the at least one tag of the initialization-function-related section to the base address, fetch an initialization function address stored in an address generated by adding the value of the at least one tag of the initialization-function-related section to the base address, and call a corresponding initialization function.

7. The system of claim 6, wherein the second processor is further configured to control the apparatus for executing security to call each initialization function by sequentially fetching values of an array from the initialization function address stored in the address generated by adding the value of the at least one tag of the initialization-function-related section to the base address, based on a size of a dynamic table initialization array of the initialization-function-related section of the shared object file.

8. The system of claim 6, wherein the second processor is further configured to control the apparatus for executing security to decrypt a security execution code file provided after encrypting an image of an execution code section of the shared object file through an encryption algorithm.

9. The system of claim 8, wherein the second processor is further configured to store the decrypted security execution code file as separate file and reconstruct the security execution code file at a location of the execution code section of the shared object file loaded into the memory.

10. A method of providing security performed by an apparatus protecting an execution package generated by assembling a shared object file and an execution engine library, the method comprising:
extracting the shared object file from the execution package;
storing a value of at least one tag of an initialization-function-related section of the extracted shared object file in separate position, and generating a security shared object file by populating the value of the at least one tag of the initialization-function-related section of the extracted shared object file with 0;
generating a security module file including the value of the at least one tag of the initialization-function-related section stored in separate position in the step of generating the security shared object file; and
generating a security execution package by combining the execution engine library of the execution package, the security shared object file provided in the step of generating the security shared object file, and the security module file provided in the generating of the security module file,
wherein at least some part of the execution package can be protected by populating with 0.

11. The method of claim 10, further comprising generating a security execution code file by encrypting an image of an execution code section of the shared object file through an encryption algorithm, wherein the generating of the security execution package comprises further including a security execution code file generated in the generating of the security execution code file to generate the security execution package.

12. The method of claim 11, wherein the generating of the security execution code file comprises separating the image of the execution code section of the shared object file as separate file and then encrypting the image through the encryption algorithm.

13. The method of claim 10 further comprising executing security by an apparatus for executing security which interacts with the apparatus for providing security, the method of executing security comprising:
calling a dynamic loader for the shared object file through an operating system;
loading the shared object file into a memory by an operation of the dynamic loader and receiving a base address of the loaded shared object file;
reading a value of at least one tag in an initialization-function-related section of the shared object file stored in separated position and adding the value to the base address; and
fetching an initialization function address stored in an address generated by adding the value of the at least one tag of the initialization-function-related section to the base address and calling a corresponding initialization function.

14. The method of claim 13, wherein the calling of the corresponding initialization function comprises calling each initialization function by sequentially fetching values of an array from the initialization function address stored in the address generated by adding the value of the at least one tag of the initialization-function-related section to the base address, by a number of a size of a dynamic table initialization array of the initialization-function-related section of the shared object file.

15. The method of claim 13, further comprising decrypting a security execution code file provided after encrypting an image of an execution code section of the shared object file through an encryption algorithm.

16. The method of claim 15, wherein the decrypting of the security execution code file comprises decrypting the security execution code file stored as separate file and reconstructing the security execution code file at a location of the execution code section of the shared object file loaded into the memory.

17. The method of claim 13, further comprising populating with a meaningless value an initialization function address stored in a location of an object file region indicated by an offset value of at least one tag in the initialization-function-related section of the shared object file.

18. The method of claim 17, further comprising populating with a meaningless value an ELF header region of the shared object file.

* * * * *